UNITED STATES PATENT OFFICE.

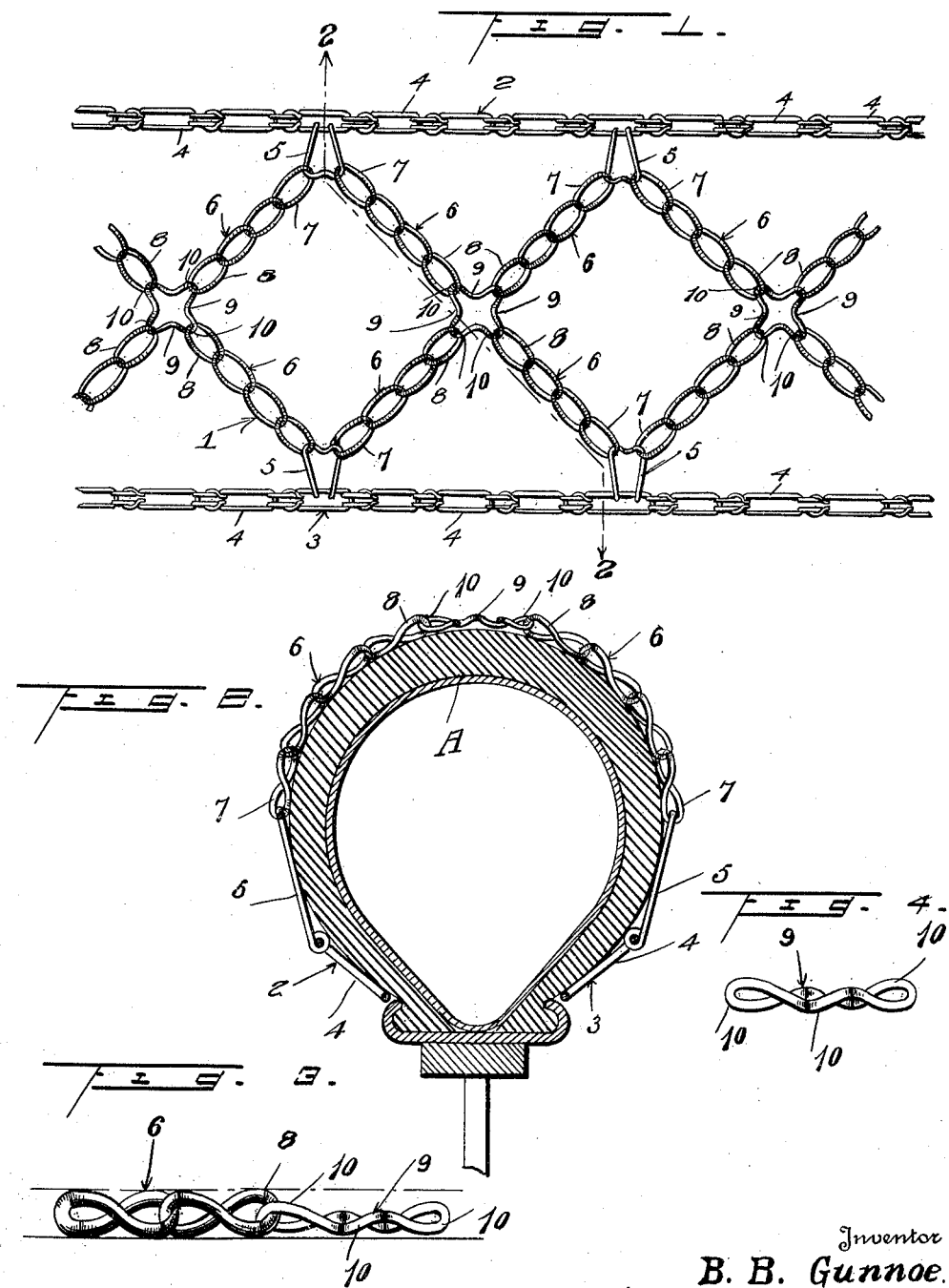

BERTA B. GUNNOE, OF BECKLEY, WEST VIRGINIA.

ANTISLIPPING ATTACHMENT FOR WHEEL-TIRES.

1,392,148.      Specification of Letters Patent.      Patented Sept. 27, 1921.

Application filed January 8, 1918, Serial No. 210,932. Renewed December 23, 1920. Serial No. 432,862.

*To all whom it may concern:*

Be it known that I, BERTA B. GUNNOE, a citizen of the United States, residing at Beckley, in the county of Raleigh and State of West Virginia, have invented certain new and useful Improvements in Antislipping Attachments for Wheel-Tires; and I do hereby declare the following to be a full, clear, and exact description of the invention, such as will enable others skilled in the art to which it appertains to make and use the same.

This invention relates to anti-slipping chains for mounting upon vehicle wheel tires, and the primary object of the invention is to provide a spider or cross chain arrangement which will effectively prevent side skidding as well as forward or rearward skidding of a vehicle wheel upon which it is mounted, and to provide a novel arrangement to accomplish this function which includes a substantially rectangular central link having the medial portions of the side members inwardly offset and provided with curved corners forming link receiving loops or seats which receive the inner ends of curbed links that radiate from the central link and have a plurality of similar curbed links connected thereto, all of which links and the corners of the central links are shaped to prominently dispose the opposite ends of the curbed links for road engagement at spaced points and to cause the chain to snugly fit or hug the tire to prevent rolling of the links of the tire tread engaging chains upon the tire.

With the foregoing and other objects in view this invention consists in such novel features of construction, combination and arrangement of parts as will be hereinafter more fully described illustrated in the accompanying drawings and claimed.

In describing the invention in detail, reference will be had to the accompanying drawings wherein like characters designate like and corresponding parts throughout the several views and in which:

Figure 1 is a fragmentary plan view of the anti-skidding chains.

Fig. 2 is a sectional view through a tire illustrating the chain applied thereto and taken on the line 2—2 of Fig. 1.

Fig. 3 is an enlarged elevation of one of the cruciform central links, showing the same connected to one of the adjoining links.

Fig. 4 is an elevation of the central cruciform irregular link.

Referring more particularly to the drawings, 1 designates the anti-skid chain as an entirety, which embodies a series of chains connected to form a mat that extends over and entirely around the periphery of the rim of a wheel, as clearly shown in Fig. 2 of the drawings.

The chain structure embodies two parallel side chains 2 and 3, which extend entirely around and rest against the sides of the cushion or pneumatic tire A. The side chains 2 and 3 are constructed of a plurality of connected links 4 certain of which links have double eye links 5 secured thereto. The double eye links 5 have cross or tread chains 6 connected thereto, the end links 7 of which chains are connected to the eyes of the double eye links 5 as clearly shown in Fig. 1 of the drawings.

The tread chains 6 are constructed of curved links and extend diagonally across the tire A, to substantially the center of the tread portion thereof. The innermost end link 8 of each of the chains 6 is connected to an irregular substantially cruciform link 9. The links 9 are substantially cruciform and are provided at their corners with link receiving arms or branches 10 forming seats for the end links 8 of the tread chains 6 of each group. The arms or branches 10 of the irregular links 9 are bent or twisted in a manner of the feathered blades of a fan wheel as is clearly shown in Fig. 4 of the drawings, so as to snugly fit in the curved end portion of the curved links 8 of the tread chain 6 and securely retain said links in such position that the opposite teminals of each is disposed for road contact at spaced points to enhance the anti-slipping quality of the tire attachment. The snug fitting connection between the link 9 and the chains 6 prevents rolling of the links of the chain upon the tires, yet it is sufficiently flexible to allow the necessary independent movement of the chain.

When the anti-slipping device is attached to the vehicle wheel, the side chains 2 and 3 lie against the sides of the tire A, adjacent to the rim of the wheel, and the chain 6 extends diagonally across the tire, with the irregular link 9 positioned or resting upon the central portion of the tread of the tire. By this arrangement it will be seen that the cross chains 6 extend substantially over the entire periphery of the tire in zig-zag directions from the irregular links 9, and by curbing the links of the chains 6 so as to provide the prominently disposed opposite ends of the links for road engagement at spaced points, a firm grip upon the road may be had and the anti-slipping device prevented from slipping regardless of the direction in which the wheels may be rotated.

Having thus fully described the invention what is claimed is:

A tire chain comprising cruciform central links each having its arms arranged diagonally with relation to the tire and angularly with relation to the plane of the link, side chains, and diagonally arranged cross chains connected to the arms of the central links and to the side chains, the angular arrangement of the arms of the central links serving to present a maximum of tread surface of the central and adjacent links whereby lateral and circumferential skidding is prevented.

In testimony whereof I affix my signature in presence of two witnesses.

BERTA B. GUNNOE.

Witnesses:
 DON SHELDON,
 NICHOLAS R. LOFTUS.